United States Patent [19]
Sato

[11] Patent Number: 4,929,457
[45] Date of Patent: May 29, 1990

[54] ICE-CREAM CONES

[76] Inventor: Takayoshi Sato, 97-5, Ohganedaira 2-chome, Matsudo-shi, Chiba-ken, Japan

[21] Appl. No.: 291,295

[22] Filed: Dec. 28, 1988

[30] Foreign Application Priority Data

Dec. 30, 1987 [JP] Japan ................. 62-336131

[51] Int. Cl.$^5$ .......................................... A21D 13/00
[52] U.S. Cl. ................................ 426/139; 426/95; 426/138; 229/1.5 B; D1/116; D1/118
[58] Field of Search ..................... 426/138, 139, 95; D1/116–119, 101, 103, 105, 102, 108, 109; D7/43, 81; 229/1.5 B; 220/23.4

[56] References Cited

U.S. PATENT DOCUMENTS

| D. 37,759 | 12/1905 | Yakushiji | D1/117 |
|---|---|---|---|
| D. 40,739 | 6/1910 | Rea | D1/116 |
| 59,333 | 10/1866 | Bullard | 215/10 |
| D. 106,071 | 9/1937 | Stuart | D1/119 |
| D. 115,494 | 7/1939 | Glass | D1/119 |
| D. 117,456 | 11/1939 | Parr | D1/102 |
| D. 117,458 | 11/1939 | Sappington | D1/119 |
| D. 118,624 | 1/1940 | Houston | D1/118 |
| D. 168,748 | 2/1953 | Marcantonio | D1/117 |
| D, 171,808 | 3/1954 | Marcantonio | D1/117 |
| D. 171,809 | 3/1954 | Marcantonio | D1/119 |
| D,171,810 | 3/1954 | Marcantonio | D1/116 |
| D. 187,906 | 5/1960 | Marcantonio | D1/117 |
| 1,654,825 | 1/1928 | Mitchell | D1/118 |
| 1,752,729 | 4/1930 | Canter | D1/119 |
| 1,800,759 | 4/1931 | Shean | 426/139 |
| 1,854,091 | 4/1932 | Young | D1/118 |
| 2,074,564 | 3/1937 | Scurlock | D7/81 |
| 2,117,404 | 5/1938 | Curtis | 220/23.4 |
| 2,362,595 | 11/1944 | Torrison | 229/1.5 H |
| 2,470,432 | 5/1949 | Cusick | 220/23.4 |
| 2,674,389 | 4/1954 | Baker et al. | 220/23.4 |
| 2,738,893 | 3/1956 | Quinones | 220/23.4 |
| 3,702,806 | 11/1972 | Oliva | 220/23.4 |
| 4,139,114 | 2/1979 | Long et al. | 215/10 |
| 4,651,900 | 3/1987 | Horvath et al. | 220/23.4 |
| 4,720,037 | 1/1988 | Alpert | 229/1.5 H |

FOREIGN PATENT DOCUMENTS

| 496474 | 10/1950 | France | 220/23.4 |
|---|---|---|---|
| 28-165 | 8/1953 | Japan . | |
| 49-32978 | 3/1974 | Japan . | |
| 50-142760 | 11/1975 | Japan . | |
| 337364 | 10/1930 | United Kingdom | 229/1.5 B |

Primary Examiner—Steven Weinstein
Attorney, Agent, or Firm—Wenderoth, Lind & Ponack

[57] ABSTRACT

An ice-cream cone is disclosed which comprises a holding part, a gripping part, and at least two vertical wall surface parts of the shape on an inverted triangle. When a plurality of three or more of such ice-cream cones are positioned for their vertical wall surface parts to be opposed to each other and are united, the holding parts of the individual cones proper are kept in a horizontal state. Thus, different kinds of ice cream can be placed separately of each other on the horizontally maintained holding parts. An ice cream cone holder is also disclosed for holding the plurality of three or more ice cream cones together as a unit.

4 Claims, 3 Drawing Sheets

ICE-CREAM CONES

FIELD OF THE INVENTION AND RELATED ART STATEMENT

This invention relates to ice-cream cones adapted for the cones proper thereof to be opposed and abutted to each other with the ice-cream holding parts thereof kept in a horizontal state at all times.

As an ice-cream cone of this kind, what is disclosed in Japanese Utility Model Publication SHO 28(19853)-165 has existed to date. The conventional ice-cream cone, though not specifically illustrated, has the cone proper thereof formed of a holding part large in diameter for holding ice cream and a gripping part continuing into the lower portion of the holding part and gradually converging downwardly. Because of this construction, a person holding the ice-cream cone by the gripping part is enabled to eat the ice cream mounted in the holding part easily without the ice cream smearing his hand.

This conventional ice-cream cone, therefore, poses no problem of any sort so long as one kind of ice cream is placed in its holding part. Where a plurality of kinds of ice cream differing in taste are to be placed together, the conventional ice-cream cone which is provided with one indivisible holding part raises a serious drawback that the different lumps of ice cream placed side by side are suffered to come into mutual contact and dissolve into each other possibly with a sharp change of taste.

An improved ice-cream cone disclosed in Japanese Utility Model Application Disclosure SHO 49(1974) 32,978 has been proposed for the purpose of overcoming this drawback. This improved ice-cream cone comprises a cone proper of the conventional structure mentioned above and another small holding part attached one side of the cone proper and separated therefrom with a separating wall. In this construction, the improved ice-cream cone permits two kinds of ice cream to be placed separately in the small holding part and the holding part of cone proper side.

This improved ice-cream cone, therefore, precludes the possibility of separate tastes of ice cream mingling and producing a different taste as experienced with the conventional ice-cream cone because it permits different kinds of ice cream to be placed separately in the holding part on the cone proper side and in the small holding part. It nevertheless entails a disadvantage that the inevitable intricacy of the shape of the cone as a whole naturally implies complication of the mold to be used in the production of ice-cream cones, which renders the mold very expensive, and consequently renders the produced ice-cream cones expensive.

As a solution, a holder for an ice-cream cone disclosed in the specification of Japanese Pat. Application Disclosure SHO 50(1975)-142,760 has been proposed.

This holder, though not specifically illustrated, comprises a basic part having formed therein a plurality of holding holes adapted to receive and hold therein the gripping part of a cone proper and an annular receiving part formed along the edge of an opening in the basic part. Owing to this construction, this holder is capable of holding a plurality of the conventional cones independently as inserted in the holding holes of the basic part.

Theoretically, this holder in actual use enables different kinds of ice cream to be placed separately of one another by setting as many cones proper in the holding holes of the basic part and then mounting the different lumps of ice cream in the holding parts of the cones proper.

Actually, however, with this holder there is a fair possibility that the different lumps of ice cream initially placed separately of each other eventually come into mutual contact and induce changes of taste because the conventional cones proper, more or less varied in shape, are generally formed in a roughly conical shape with the holding part given a fairly large diameter as compared with the gripping part so that when a plurality of these conically shaped cones proper are retained in the holding holes of the basic part of the holder, the individual adjacent cones proper except for the one located at the center which may be allowed to keep the mounting part thereof in a horizontal state are tilted owing to the conical shape.

Moreover, the plurality of cones proper retained on the basic part of the holder are destined to be invariably kept in an unsteady state, so that a person is not allowed to eat the lumps of ice cream with perfect freedom from care. When a little child uses this holder, there arises a possibility that melting ice cream will overflow the annular receiving part of the holder and smear the child's hands and clothing.

Further, the fact that the holder designed exclusively for holding ice-cream cones is additionally prepared and used does not prove to be very desirable from the economic point of view.

OBJECT AND SUMMARY OF THE INVENTION

It is a main object of this invention to provide an ice-cream cone of a unique shape which gives a perfect solution for the various problems posed by the conventional and improved ice-cream cones described above and the problems raised by the holder for ice-cream cones.

To accomplish this object, the present invention contemplates an ice-cream cone which comprises a holding part of large diameter for receiving and holding a lump of ice cream, a gripping part continuing at one end thereof into the lower potion of the holding part and gradually converging in the direction of the other end thereof, and at least one vertical wall part of the shape of an inverted triangle formed as extended from the holding part through the gripping part. When this ice-cream cone and other ice-cream cones of the same construction are placed with their vertical wall parts opposed to each other and are then adjoined, they can be united in a state allowing their several holding parts to remain in a horizontal position.

This invention also contemplates adopting a construction in which the lateral all of the holding part and the gripping part except for the vertical wall part assumes a cross section roughly resembling an arc. It further contemplates a construction which further comprises a cover similar to the united cross-sectional shape of a plurality of gripping parts and which, therefore, enables the plurality of gripping parts in the state to be inserted in the cover.

The other objects and characteristics of the present invention will become apparent from the description to be given in further detail hereinbelow with reference to the accompanying drawings.

DESCRIPTION OF THE PREFERRED EMBODIMENT

Figure 1:
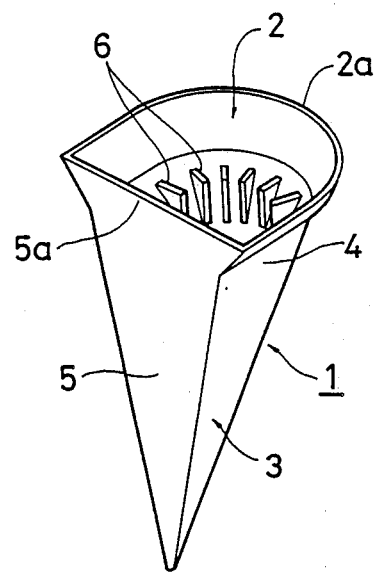
FIG. 1 is a perspective view illustrating a typical ice-cream cone as the first embodiment of this invention.
Figure 2:
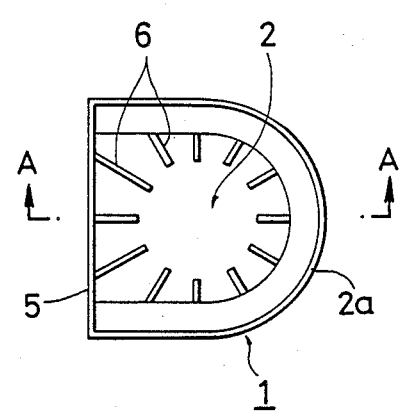
FIG. 2 is a plan view of the same ice-cream cone.
Figure 3:
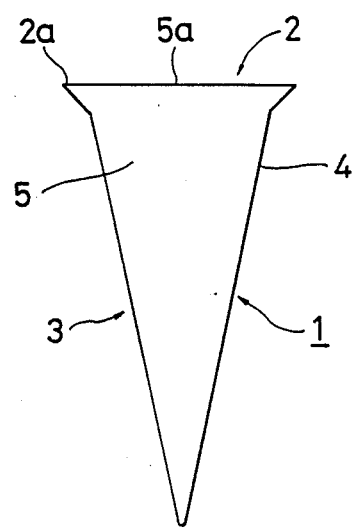
FIG. 3 is a side view of the same ice-cream cone.
Figure 4:
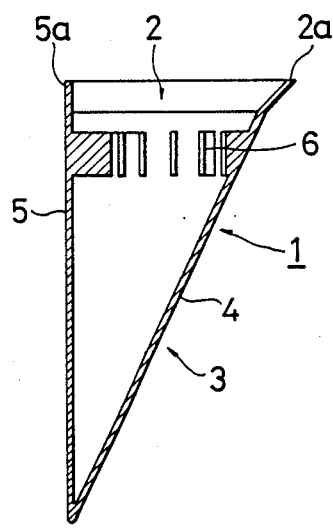
FIG. 4 is a cross section taken through FIG. 2 along the line A—A.

Now, the present invention will be described in detail below with reference to working examples illustrated in the accompanying drawings.

The ice-cream cone of the first embodiment also has a cone proper 1 comprising basically a holding part 2 of a large diameter for receiving and holding a lump of ice cream and a gripping part 3 continuing at the upper end into the lower portion of the holding part and gradually converging in the direction of the lower end thereof as illustrated in FIG. 1 to FIG. 4. It is characterized by the fact that, instead of forming the cone proper 1 in a completely conical shape as heretofore practised, a vertical wall part 5 in the shape of an inverted triangle is positively formed in part of a lateral wall 4 defining the holding part and the gripping part 3.

The lateral wall 4 of the holding part 2 and the gripping part 3 except for the vertical wall part 5 of the shape of an inverted triangle, therefore, is formed in a cross section of the shape of an arc roughly resembling the letter U. It continues from the holding part 2 of a large diameter to the gripping part 3 of a gradually decreasing diameter. The edges of the lateral wall 4 join those of the vertical wall part 5.

In the present embodiment, an upper edge 2a of the holding part 2 is amply flared and, at the same time, a plurality of projecting pieces 6 are formed integrally on the inner surface of the lateral wall defining the holding part 2. The projecting pieces 6 coupled with the flared upper edge 2a ensure safe placement of a lump of ice cream in the holding part 2. The upper edge of the vertical wall part 5 possesses an extended part 5a conforming to the diverging shape of the upper edge 2a of the holding part 2 and terminating in the same level as the upper edge 2a of the holding part 2.

When the ice-cream cone of the first embodiment is used for one kind of ice cream, a server has simply to place the one kind of ice cream on the holding part 2 of the cone proper 1 and a customer to take hold of the filled ice-cream con by the gripping part 3 of the cone proper 1 so that the customer is allowed to eat the ice cream without any worry about his hand being smeared with the ice cream.

When two kinds of ice cream are to be used, the server prepares two ice-cream cones, holds them in such manner that the vertical wall parts 5 of their cones proper 1 are opposed to each other, and joins them in that manner. Then, the two cones proper 1 are united in a perfectly abutted state. The server is subsequently required to place two lumps of ice cream 7 separately in the holding parts 2 of the two cones proper 1 so that the two lumps of ice cream are held in place independently of each other.

When the two cones proper 1 are held in the united state, their vertical wall parts 5 operate for keeping the holding parts 2 safely in a horizontal state to preclude the possibility of the two lumps of ice cream 7 separately held in the two holding parts 2 coming into mutual contact and inducing a change of taste and also remove the possibility of the ice cream melting and overflowing the cones proper 1 and drooping down.

When the two cones proper 1 are united as described above, therefore, they assume the appearance of one ice-cream cone containing two separte holding parts.

Where two cones proper 1 are used in the united state for the purpose of serving two kinds of ice cream, a cover 8 with a brim 8a made of paper or resin in a shape similar to the united shape of the two gripping parts 3 as illustrated in the drawing proves to convenient. When the two gripping parts 3 in the united state are inserted in the cover 8, the cover serves the purpose of infallibly keeping the two cones proper 1 in the united state and greatly facilitating their handling. If the ice cream happens to melt and flow down the lateral wall 4 of the cone proper 1, the brim 8a of the cover 8 efficiently checks the flow of the molten ice cream and prevents it from smearing the customer's hand or clothing.

Figure 6:
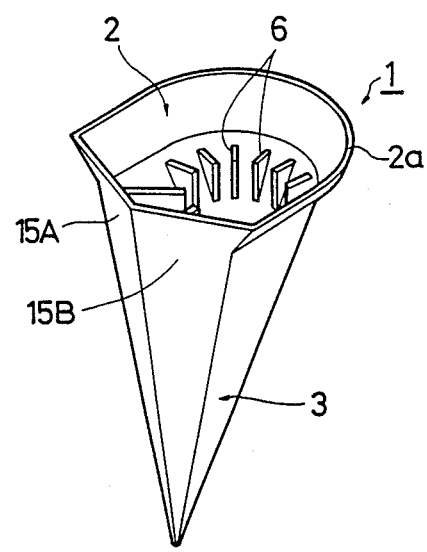
FIG. 6 is a perspective view illustrating a typical ice-cream cone as the second embodiment of the invention.
Figure 5:
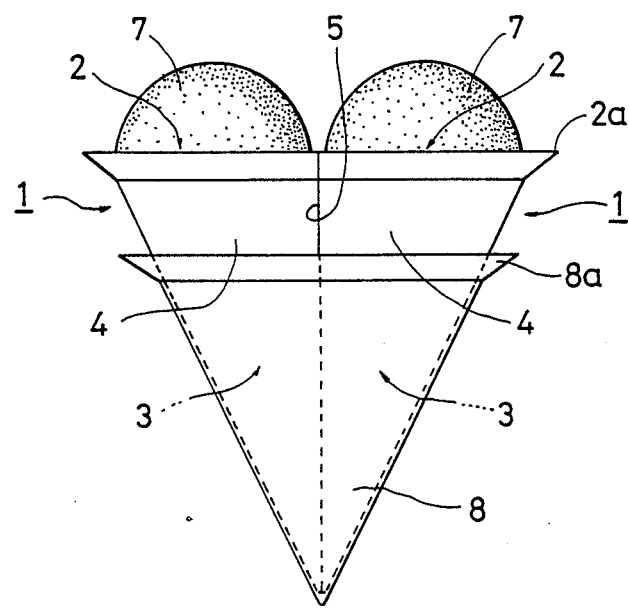
FIG. 5 is a front view illustrating the ice-ream cone of the first embodiment in the state of use.

Now, an ice-cream cone of the second embodiment will be described. In contrast to the ice cream of the first embodiment which has one vertical wall part 5 of the shape of an inverted triangle formed in part of the lateral wall 4 defining the holding part and the gripping part 3, the ice-cream cone of the second embodiment has two vertical wall parts 15A, 15B continuing side by side into each other with a prescribed angle (an aliquot part of 360°) formed in part of the lateral wall 4 as illustrated in FIG. 6. In all the other respects, this ice-cream cone has the same construction as that of the first embodiment. The explanation on the identical component parts will be omitted.

Figure 7A:
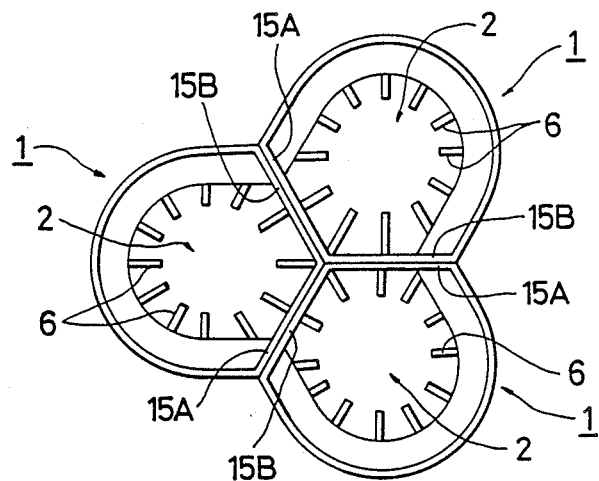
FIGS. 7 A and B are plan views illustrating the ice-cream cone of the second embodiment in the state of use.
Figure 7B:
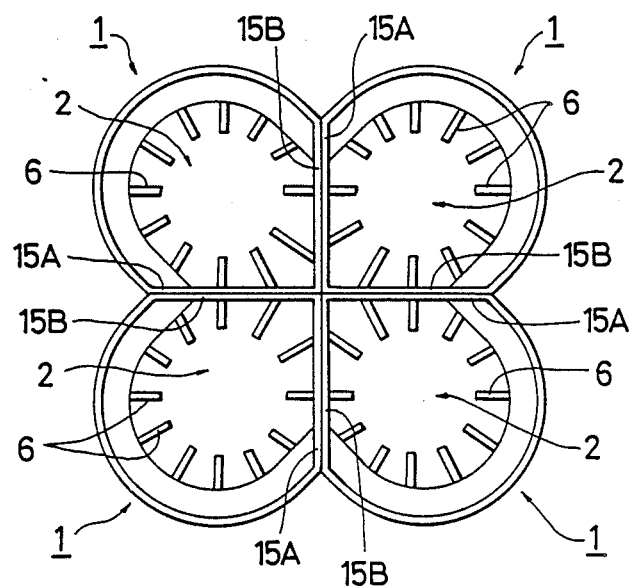

Of course, the ice-cream cone of the second embodiment can be used for one kind of ice cream. Since this ice-cream cone has two vertical wall face parts 15A, 15B, proper selection of the included angle of these two vertical wall surface parts 15A, 15B enables three or four cones proper 1 to be united together as illustrated in FIG. 7a or FIG. 7B. Thus, the ice-cream cone of the second embodiment has an advantage that more kinds of ice cream can be placed separately from one another than that of the first embodiment.

In the second embodiment, similar to the first embodiment, the holding parts 2 in the united state are maintained safely in a horizontal state by the operation of the two vertical wall surface parts 15A, 15B. Thus, the possibility of the plurality of kinds of ice cream placed in the individual holding parts 2 coming into mutual contact and inducing a change of taste and the possibility of the ice-cream melting and overflowing the cones proper 11 are perfectly removed.

Where the plurality of cones proper 11 are united, the cover 8 with the brim 8a described in the first embodiment may be utilized as occasion demands.

As described above, the ice-cream cone of this invention is characterized by the fact that a plurality of ice-cream cones are united with the holding parts kept in a horizontal state because the ice-cream cones have at least one vertical wall surface part of the shape of an inverted triangle formed in part of the lateral wall defining the holding part and the gripping part and, owing to the vertical wall surface parts, the ice-cream cones are tightly united face to face. The individual holding parts of the ice-cream cones in the united state led themselves to enabling different kinds of ice cream to be placed separately of one another. Thus, the possibility of the different kinds of ice cream melting and coming into mutual contact and inducing a change of taste is completely removed by this invention.

When the plurality of ice-cream cones are held in the united state, the possibility of the different kinds of ice cream overflowing the cones proper is remote because the holding parts are infallibly held in the horizontal state.

Indeed this invention is directed to ice-cream cones which are intended to permit simultaneous serving of different kinds of ice cream. The ice-cream cones, however, basically have one identical construction The possibility of the mold used for their production being intricate and prohibitively expensive is substantially nil. The ice-cream cones of this invention are inexpensive further in the sense that one and the same mold suffices for their production.

When the plurality of ice-cream cones are used in the united state, the cover with the brim similar to the joined shape of gripping parts facilitates the handling of the gripping parts in the united state. If the ice cream happens to met and flow down the lateral wall of the cone proper, the brim of the cover checks the flow of the molten ice cream and prevents it from smearing the customer's hand and clothing.

What is claimed is:

1. An ice-cream cone comprising an elongated molded shell having an open top portion and a closed bottom portion,
    said open top portion comprising an integral annular bowl-shaped holding part for receiving and holding ice cream, said holding part lying horizontal relative to the vertically extending longitudinal axis of said cone,
    said closed bottom portion integrally extending downwardly from said top portion and constituting a gripping part for gripping the ice-cream cone, said closed bottom portion gradually converging in diameter to an end distal to the open top portion,
    said molded shell having a plurality of walls including a pair of vertical flat radial walls, each vertical wall extending continuously from the top of said holding part to said converged bottom closed end, and each vertical wall being formed in the shape of an inverted triangle and angularly connected to each other at their respective adjacent vertical sides, said pair of vertical walls being vertical relative to the horizontally oriented holding part and converging at an angle relative to each other such that a plurality of at least three ice-cream cones can be positioned with their respective vertical walls adjacent and abutting each other in a united state while simultaneously maintaining the holding parts horizontal.

2. The ice-cream cone according to claim 1, wherein the molded shell, other than the pair of vertical flat radial walls, is substantially arc-shaped in cross section.

3. The ice-cream cone according to claim 1, wherein the open top portion has an open top surface which is outwardly flared.

4. A combination of a plurality of at least three ice-cream cones, each ice-cream cone having the structure as recited in claim 1,
    wherein said plurality of at least three ice cream cones are positioned with their respective vertical walls adjacent and abutting each other in a united state while their respective holding parts are maintained horizontal.

* * * * *